INVENTOR.
YASUHIRO OSHIMA

United States Patent Office 3,441,635
Patented Apr. 29, 1969

3,441,635
MANUFACTURING METHOD OF PARTLY COLORED AND PATTERNED LACE WORKS MADE OF THERMOPLASTIC SYNTHETIC RESIN
Yasuhiro Oshima, Meiwagravure Chemical Co. Ltd., 860 Kashida, Fuse, Osaka, Japan
Filed June 22, 1966, Ser. No. 559,478
Int. Cl. B29c *13/04*; C23f *7/06*
U.S. Cl. 264—166                            2 Claims

ABSTRACT OF THE DISCLOSURE

A method of manufacturing partly colored and patterned lace works of thermoplastic resin wherein an oxidizing or reducing agent is fed on the surface of a metallic pattern which is constituted of at least two different metals. As a result, one or more of them undergo a chemical change and particles of colored metallic compounds are produced on the surface of the metallic pattern. Then the surface is coated with a thermoplastic synthetic resin paste, which attaches the colored metallic particles. A lace pattern work tinged to the colors of the attached colored metallic particles is produced by heating the thermoplastic synthetic resin paste in order to gel the same.

---

The present invention relates to a manufacturing method of partly colored and patterned lace works of thermoplatsic synthetic resin.

In the past, when manufacturing partly colored and patterned lace works made of a thermoplastic synthetic resin, such as polyvinyl chloride paste or the like, for example, it has been generally necessary to first make a single hued pattern work with the use of an intaglioed metallic pattern, and second, the pattern work should be partly colored by printing or spraying by a spray gun. Instead, it has been a common practice to make first a single hued polyvinyl chloride synthetic resin pattern work by silk screen printing which is repeated thereon two or three times in order to partly color the pattern work. Consequently, it has been impossible to produce exquisite pattern works or to achieve a solid or cubic coloring, by which not only the horizontal surface of the pattern work, but also its sides can be colored.

It is an object of the present invention, therefore, to eliminate the above mentioned disadvantages of the conventional methods. The manufacturing method according to the present invention is characterized by the fact that, without either using a spray gun, or overlapping printing, two or three times, the required part of the pattern work can be partly colored in different hues by a single operation by means of the metal which constitutes the surface of the metallic pattern and various metallic compounds produced by the chemical reaction between the metal and its oxidizing or reducing agents.

With this and other objects in view, which will become apparent in the following detailed description, the present invention will be clearly understood in connection with the accompanying drawings, in which.

Figure 1:
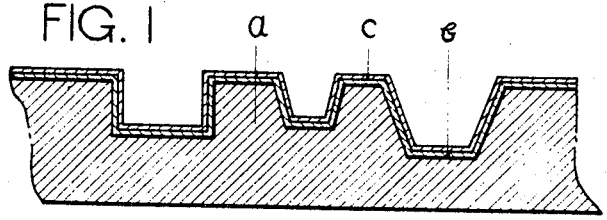
FIGS. 1–4 and 6 are partial, enlarged cross-sectional views of the metallic pattern.
Figure 2:
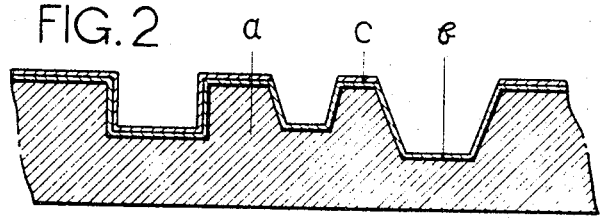

Referring now to the drawings, and more particularly to FIG. 1, any required lace pattern is first intaglioed by a photo-mechanical process upon a brass plate $a$ of about 2.5 mm., for instance, upon the surface thereof. A copper plating $b$ of about 0.02–0.03 mm. is then effectuated thereon. Upon the intaglioed brass plate $a$, double plating layers $b$ (e.g., copper) and $c$ (e.g., chromium) different metals are provided. An uncolored part of the chromium plating $c$ is coated with an acid-proof paint, such as asphalt, and then the part is placed into a hydrochloric acid bath which strips off the chromium plating layer on the portions not coated with the acid-proof paint, which condition is shown in FIG. 2.

Figure 3:
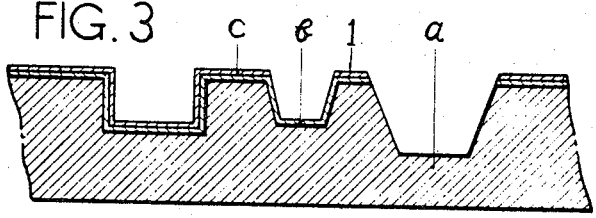

Next, a portion of the plated parts $b$ and $c$ is coated with the acid-proof paint, while the other portion which is not coated with the paint is treated by a ferric chloride solution, so that the copper plated layer $b$ is stripped off and the metallic pattern having the surface constituted of three different kinds of the metals such as chromium (Cr), layer $c$, copper (Cu), layer $b$ and brass, plate $a$, is formed. This metallic pattern is shown in FIG. 3.

Figure 4:
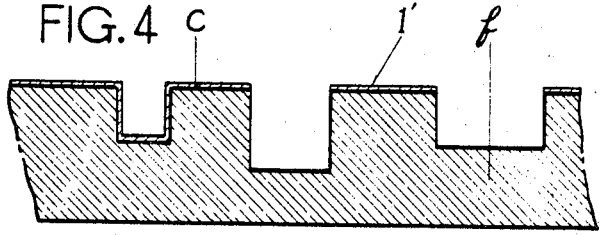

On the other hand, a metallic pattern 1' made of a different basic material, such as iron (Fe) is produced as shown in FIG. 4. Its surface is partly chromium-plated, so that the surface may be constituted of iron (Fe) and chromium (Cr).

The required metallic pattern is then made from these metallic patterns and polyvinyl chloride synthetic resin, by a process which will be explained in reference to an apparatus used therefor, illustrated in FIG. 5.

Figure 5:
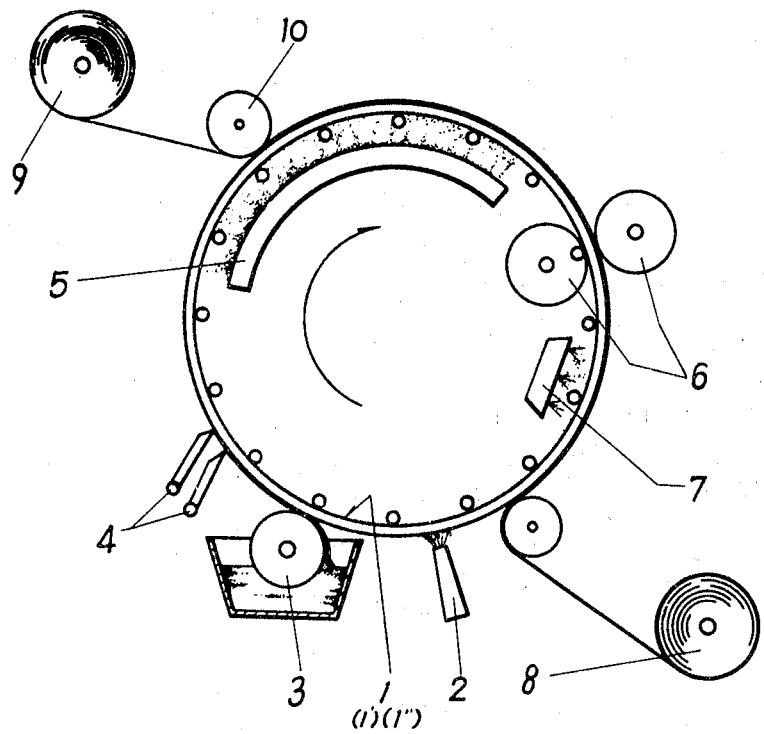
FIG. 5 is a schematic diagram of the equipment used in the manufacturing method.

Referring now again to the drawings, and more particularly to FIG. 5, the metallic pattern 1 is revolved by a driving roll 6 as indicated by the arrow. On one side beneath the metallic pattern 1 is arranged a nozzle 2 which sprays thereon an oxidizing or reducing agent of copper (Cu), i.e. layer $b$, and brass, i.e. layer $c$, which constitute the metallic pattern. The nozzle 2 also sprays over the copper and brass a vapor containing potassium sulfide ($K_2S$), for example, which does not affect chromium (Cr), i.e. layer $c$, but which brings about a chemical change in the copper (Cu) and brass which are shown as layers $a$ and $b$ in FIG. 3.

By feeder 3 arranged beneath the metallic pattern and on the opposite side of the nozzle 2, a paste like polyvinyl chloride synthetic resin, which is composed of 100 parts of polyvinyl chloride synthetic resin paste 121–L of Nippon Zeon K.K.), 38 parts of the plasticizer dioctyl phthalate, 2 parts of the stabilizer (L.K.B.Z. of Sakai Kagaku K.K.) and 6 parts of the coloring agent (titanium oxide), is painted on the surface of the metallic pattern 1. The paste on the parts other than the intaglioed part is removed by a doctor 4 provided over the metallic pattern 1. The paste-like polyvinyl chloride synthetic resin is heated at approximately 180° C. for about 3 minutes by heater 5 installed over the doctor 4 so as to effect its gelation. Then it is cooled by cooler 7 arranged over the nozzle 2, on the opposite side of the doctor 4.

Finally, the product is wound up by winder 8 to constitute the finished goods. Since the oxidized particles of the brass and copper, or the reduced particles, attach to the part contacting layers $a$ and $b$, with the exception of the chromium part, i.e. layer $c$ of the metallic pattern, and the part contacting layers $a$ and $b$ are tinged with a brown color layer $a'$ or a dark cream color in the case of the oxidation by means of potassium sulfide ($K_2S$), the finished goods will be the lace pattern work tinged with two different colors in addition to the color of the material paste.

When the metallic pattern 1' shown in FIG. 4 is used, the metallic copper will be reduced in part $f$, if the nozzle 2 (FIG. 5) is charged with a positive electric current of about 0.5 volt DC, while the metallic pattern 1' is charged with a negative current and the solution of copper sulfate is sprayed out of the nozzle 2.

Consequently, if the metallic pattern is formed out of the pasty polyvinyl chloride synthetic resin as above mentioned, the particles of metallic copper will attach to the part *f* only to bring out metallic lustre.

There is another coloring process in contrast to the above mentioned methods, whereby the metallic pattern is colored by filling it with the resin after causing a chemical change by spraying chemical agents out of the nozzle 2 over a part of the metal which constitutes the surface of the metallic pattern. In the other coloring method, according to the present invention, no chemical agent is sprayed, but chemical agents, which will cause a chemical change selectively in a part of the metal, are mixed into compounds of a paste of polyvinyl chloride synthetic resin, and thereafter the metallic pattern will be colored, while simultaneously moulded.

Figure 6:
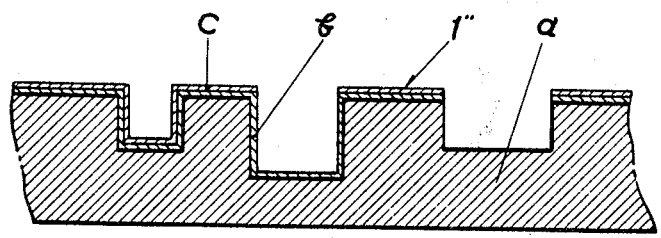
Figure 7:
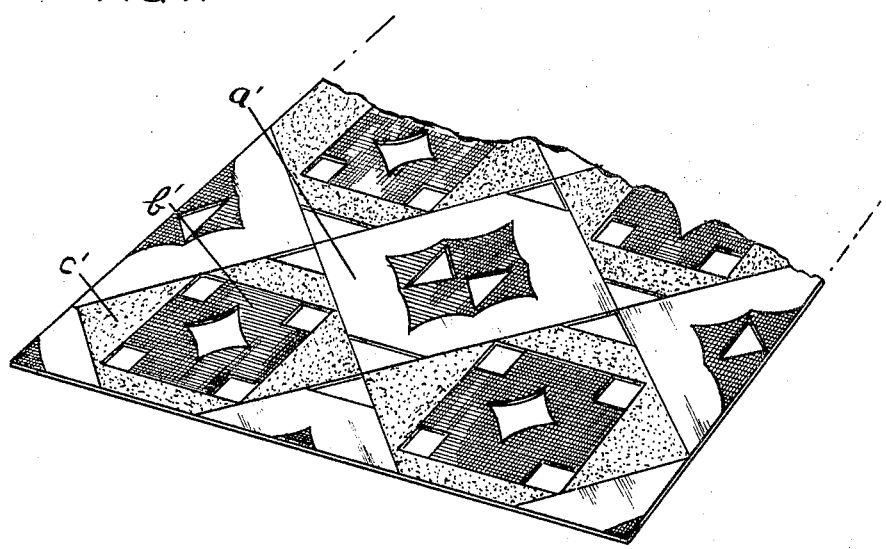
FIG. 7 is a partial perspective view of goods made by the method.
Figure 8:
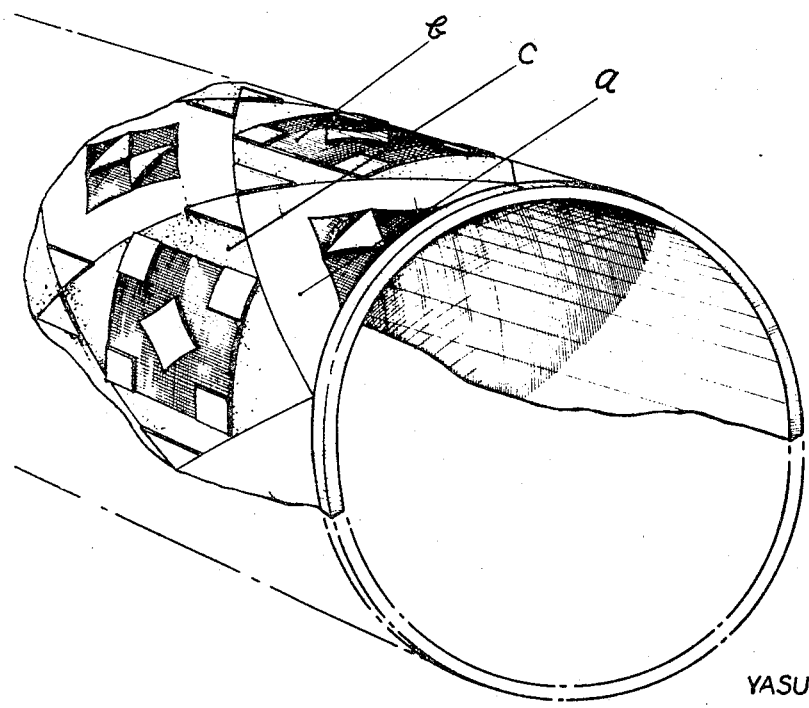
FIG. 8 is a fragmentary perspective view of the metallic pattern described in FIGS. 1–4 and 6.

Referring now again to the drawings, and more particularly to FIG. 6, a metallic pattern 1″ is illustrated having a surface which is first made up of a copper layer *a* and metal layers *b* and *c* of different kinds, such as chromium (Cr), cadmium (Cd) or selenium (Se).

The metallic pattern 1″ is rotated at a speed of 1 m–4 m per minute in the direction as indicated by the arrow, while the paste of polyvinyl chloride synthetic resin coats the surface of the metallic pattern by the use of the feeder 3 so as to evenly fill up the intaglioed part by the doctor 4. After gelation of the resin by heating by the heater 5 at around 180° C. for about 3 minutes, it is cooled by the cool air blown out of the cooler 7. Finally, it is wound up by the winder 8 as the product.

On the other hand, such sulphuric compounds as ammonium carbonate $(NH_4)_2CO_3H_2O$ or polysulphide (which will selectively react with the metal constituting the metallic pattern so as to change color, or the coloring agents, which react with such special metals only that contain at least one amino group or imino group in one molecule, such as hexamethylene tetramine and phenyl-$\beta$-naphthylamin), are mixed into the paste of polyvinyl chloride synthetic resin and, by the reaction between the metal of the metallic pattern and the selective coloring agent (hereinafter called the partial coloring agent), the synthetic resin of their contacting portions only are changed in color. Accordingly, the metallic pattern becomes a differently colored pattern composed of color-changed portion *a′* and unchanged portion *b′*.

The paste consisting of polyvinyl chloride synthetic resin is compounded and colored in various ways according to the invention as follows:

EXAMPLE 1

Compounds.—100 parts of polyvinyl chloride paste resin (121–L made by Nippon Zeon K.K.), 58 parts of the plasticizer (dioctyl phthalate), 2-parts of the stabilizer (dibutyl-tin-malate such as the tin-mercaptide group stabilizer which is non-sulphuric), 6 parts of the coloring agent (titanium oxide ($TiO_2$)) and 2 parts of the partial coloring agent, pulverized ammonium carbonate $(NH_4)_2CO_3H_2O$.

The required lace pattern work can be made with the above mentioned compounds by the use of the metallic pattern made of copper and chromium. In this case, the ammonium carbonate contained in the above mentioned paste, which contacts the copper, will react with the copper, so that the contacting part of the paste will be tinged blue. No reaction takes place in the part where it contacts the chromium instead of the copper, and the part will remain white so that the two-color pattern can be produced.

EXAMPLE 2

Compounds.—100 parts of polyvinyl chloride paste resin (121–L of Nippon Zeon K.K.), 58 parts of the plasticizer, dioctyl phthalate), 2 parts of the stabilizer (tin-mercaptide such as 17–M made by Katsuta Kako K.K.), and 6 parts of the coloring agent (titanium oxide $TiO_2$).

In this instance the tin-mercaptide used as the stabilizer will react with the copper to color the product in beige, leaving out all the rest unchanged. This makes a two-color pattern in beige and white. In other words, the tin-mercaptide will act in this case as a stabilizer as well as a partial coloring agent, for which such a sulphurous compound as polysulphide likewise can be used.

EXAMPLE 3

Compounds.—100 parts of polyvinyl chloride paste resin (121–L of Nippon Zeon K.K.), 58 parts of the plasticizer (dioctyl phthalate), 2 parts of the stabilizer (dibutyl-tin-malate which is non-sulphurous such as the stabilizer of tin-mercaptide groups), 6 parts of the coloring agent (titanium oxide) and 2 parts of the partially coloring agent (hexamethylene tetramine).

With the above-mentioned compound, the required product can be obtained by means of the method according to the invention. In this instance, the part of the compound which contacts the copper will be tinged blue, while the rest remains unchanged in white so as to make the two color pattern in blue and white. As the partial coloring agent, polyamide resin and phenyl $\beta$ naphtyl amine which have more than at least one amine or imino group in one molecule likewise can be used.

EXAMPLE 4

Compounds.—100 parts of polyvinyl chloride paste resin (121–L of Nippon Zeon K.K.), 58 parts of the plasticizer (dioctyl phthalate), 2 parts of the stabilizer (which is non-sulphurous such as the one of tin-mercaptide group: 17–M of Katsuta Kako K.K.) and 6 parts of the coloring agent (titanium oxide).

When using the above-mentioned compounds, the product will be partially tinged yellow in case of cadmium-plating, but red with selenium-plating, while the rest of the pattern will remain as above-mentioned.

In the above description of the invention, polyvinyl chloride paste resin is used as the thermoplastic paste resin. However, the method according to the invention is not limited to the use of polyvinyl chloride resin. Any pasty thermoplastic resin regardless of its kind can be used when making similar or equal products.

When obtaining a pattern laminated on its back with a film or sheet, an appropriate base material 9 may be pressed against the pattern by press roll 10 which contacts the metallic pattern 1 disposed outside the heater 5, (FIG. 5), so that the color of the base material may be added to produce colorful goods.

The principle of the invention can also be applied in case of an embossing process by pressurizing the metallic pattern upon the synthetic resin sheet or leather goods.

The lace pattern work which is made to have partial coloring according to the invention has various advantages over goods made by any of the conventional methods. The colors can be tinged exactly in the same positions as originally intended and the three intaglioed sides of the metallic pattern can be evenly colored, while the color can be varied by changing the plated metal, the base material metal of the metallic pattern, the oxidizing or reducing agent and the partial coloring agent mixed into the resin. In addition, since the color oxidizing or color reducing metallic film is so thin about 30,000 products can be obtained in the above-mention cases. By re-plating the metallic pattern, it can be continuously used as long as its mechanical life lasts. Consequently, the method according to the invention can demonstrate very remarkable advantages in comparison with the known conventional methods and permits the production of far better lace pattern work.

What is claimed is:
1. A method of manufacturing synthetic resin lace pattern works, comprising the steps of:
    preparing the surface of a metallic pattern of at least two different metals, feeding upon said surface chemical reagents which react with said different metals which constitute said surface, so as to produce thereupon particles of colored metallic compounds, coating said surface of said metallic pattern with a thermoplastic synthetic resin paste which attaches the colored metallic particles, and heating said thermoplastic synthetic paste to gel the same and produces a lace pattern work tinged to the colors of the attached colored metallic particles.

2. A method of manufacturing synthetic resin lace pattern works, comprising the steps of:

preparing the surface of a metallic pattern of at least two different metals, mixing chemical agents which can react selectively on said different metals which constitute said surface together with a thermoplastic synthetic resin paste, coating said surface of said metallic pattern with the mixture of said chemical agents and said thermoplastic synthetic resin paste, which moulds and produces thereupon particles of colored metallic compounds and simultaneously attaches the colored metallic particles, and heating said thermoplastic synthetic paste to gel the same and produce a lace pattern work tinged to the colors of the attached colored metallic particles.

No references cited

ROBERT F. WHITE, *Primary Examiner.*

T. J. CARVIS, *Assistant Examiner.*

U.S. Cl. X.R.

264—171, 245, 338; 117—25; 148—6.14